United States Patent [19]

Ko

[11] Patent Number: 5,826,676
[45] Date of Patent: Oct. 27, 1998

[54] FAILSAFE HYDRAULIC STEERING SYSTEM FOR USE IN AN INDUSTRIAL VEHICLE

[75] Inventor: Hyun Gie Ko, Namdong-gu, Rep. of Korea

[73] Assignee: Daewoo Heavy Industries, Ltd., Incheon, Rep. of Korea

[21] Appl. No.: 716,115

[22] Filed: Sep. 19, 1996

[30] Foreign Application Priority Data

Sep. 19, 1995 [KR] Rep. of Korea ............... 1995-30777

[51] Int. Cl.⁶ .................................................. B62D 5/06
[52] U.S. Cl. ................................ 180/403; 180/406
[58] Field of Search ........................... 180/402, 403, 180/405, 406

[56] References Cited

U.S. PATENT DOCUMENTS

| | | | |
|---|---|---|---|
| 3,820,620 | 6/1974 | Miller et al. | 180/406 |
| 4,190,130 | 2/1980 | Beck | 180/406 |
| 4,317,499 | 3/1982 | Miller | 180/406 |
| 4,345,660 | 8/1982 | Miller | 180/406 |
| 4,410,057 | 10/1983 | Johnson | 180/406 |
| 4,470,259 | 9/1984 | Miller et al. | 180/403 |
| 4,553,389 | 11/1985 | Tischer et al. | 180/403 |

*Primary Examiner*—Kevin Hurley
*Attorney, Agent, or Firm*—Lowe Hauptman Gopstein Gilman & Berner

[57] ABSTRACT

The inventive steering system is of the type having an engine, a fluid reservoir, a steering valve unit, an actuator control valve unit, a main fluid pump driven by the engine for pumping the fluid in the reservoir to feed pressure fluid to the steering valve unit and the actuator control valve unit and a priority valve for enabling the pressure fluid to be first supplied to the steering valve unit. Characteristically, the steering system includes an electric motor, a battery selectively connected to the electric motor for supplying electric current to the electric motor, an auxiliary fluid pump rotatingly driven by the electric motor to produce emergency steering fluid to be fed to the steering valve unit and a power supply controller for disconnecting the electric motor from the battery while the main pump produces the pressure fluid and for connecting the electric motor to the battery when no pressure fluid is discharged from the main pump.

6 Claims, 2 Drawing Sheets

FAILSAFE HYDRAULIC STEERING SYSTEM FOR USE IN AN INDUSTRIAL VEHICLE

FIELD OF THE INVENTION

The present invention relates generally to a hydraulic steering system adapted for use in such an industrial vehicle as forklift truck and, more specifically, to a failsafe hydraulic steering system which can keep the power steering function alive even when an engine-driven fluid pump becomes unable to produce any pressure fluid due the failure thereof or the engine failure.

DESCRIPTION OF THE PRIOR ART

As widely known in the art, the steering systems for an industrial vehicle are categorized into a manual steering system wherein the steering operation is effected exclusively by way of the driver's physical force applied to a steering wheel and a hydraulic steering system wherein the driver can rely upon the power of a pressurized fluid to render the steering operation effective. The latter system, usually employed in a forklift truck, is sometimes referred to as full hydraulic steering system in the sense that almost all of the steering force shall be derived from the hydraulic fluid under pressure. The hydraulic steering system may be further divided into two types, depending on the specific construction thereof. In one type of the hydraulic steering system, the steering wheel is mechanically associated with a steering control valve which governs the flow rate of the fluid fed to a steering cylinder. In the other type of the hydraulic steering system, the position of the steering control valve is controlled by virtue of the pressure fluid delivered from a metering pump which remains mounted on the steering wheel.

A representative example of the prior art hydraulic steering system for a forklift truck is shown in FIG. 1, which includes an engine 101 and a fluid pump 102 rotatingly driven by the engine 101 to feed pressure fluid to a priority valve unit 103. Fluidly connected to an actuator control valve unit 104 and a steering valve unit 105, the priority valve unit 103 serves to first supply the pressure fluid to the steering valve unit 105 and then to the actuator control valve unit 104, assuring a stabilized steering operation while the forklift truck is in service. The pressure fluid delivered to the steering valve unit 105 in this way is admitted into the left side or right side pressure chamber of a steering cylinder 107, depending on the turning direction of a steering wheel 106 kept in mechanical association with the steering valve unit 105, such that the steering cylinder 107 may be caused to move in the left or right direction, thereby bringing the wheels of the forklift truck into a desired orientation. In the meantime, the pressure fluid delivered to the actuator control valve unit 104 is utilized to cause retraction or extension of an actuator cylinder 112 which in turn will actuate the working implements, e.g., forks, of the forklift truck.

Provided in the steering valve unit 105 is a three position steering valve 108 that, responsive to the clockwise or counterclockwise rotation of the steering wheel 106, may be moved into a first or second operative position from a neutral position so as to feed the pressure fluid to a hydraulic motor 109, which hydraulic motor will then be turned forward or in reverse together with the steering wheel 106. The flow rate at which the pressure fluid is fed to the hydraulic motor 109 may vary with the turning speed of the steering wheel 106. The pressure fluid discharged from the hydraulic motor 109 is delivered to the steering cylinder 107 via the steering valve 108. It should be worth noting that the flow rate Qs of the pressure fluid directed to the steering cylinder 107 is given by the equation:

$$Q_S = N_S \times q_{th1} \times \eta_{v1}/1000 = N_e \times q_{th2} \times \eta_{v2}/1000 = Q_P \quad [1]$$

wherein $Q_P$ denotes the flow rate (l/min) of the pressure fluid at the outlet of the fluid pump 102, $N_S$ the turning speed (rpm) of the steering wheel 106, $\eta_{v1}$ the volumetric efficiency of the hydraulic motor 109 in the steering valve unit 105, $N_e$ the rotating speed (rpm) of the engine 101, $q_{th1}$ the capacity (cc/rev) of the hydraulic motor 109 in the steering valve unit 105 and $q_{th2}$ the capacity (cc/rev) of the fluid pump 102.

As is apparent from equation [1], in the event that the engine 101 or the fluid pump 102 ceases to operate due to its failure, $Q_P$ would be equal to zero. If, at this time, the steering wheel 106 is turned manually for the sake of shifting the steering valve into one of the first and second operative positions, the fluid in a reservoir 110 has a tendency to be sucked into the hydraulic motor 109 via a check valve 111 and the steering valve 108. In addition, such an unwanted failure of the engine 101 or the fluid pump 102 would draw the internal fluid pressure of the entire steering system down to nearly zero. As a result, the fluid pressure required to actuate the steering cylinder 107 depends exclusively on the torque manually applied to the steering wheel 106. To be more specific, the fluid pressure $P(Kgf/cm^2)$ for the actuation of the steering cylinder 107 is determined by equation:

$$P = \frac{T \times 200\pi}{q} \quad [2]$$

wherein T is the torque(Kgf·m) applied to the steering wheel 106 by the driver and q is the capacity (cc/rev) of the hydraulic motor 109 in the steering valve unit 105.

Realistically and practically, it will be apparent that the driver for the forklift truck is hardly able to produce the torque T great enough to satisfy the fluid pressure P in equation [2]. This means that no pressure fluid would be supplied to the steering cylinder 107 and thus the steering operation would become unavailable in case where the engine 101 or the fluid pump 102 should fail. The unavailability of the steering operation may lead to an accident that the moving forklift truck gets crached against objects or persons lying in the moving way of the forklift truck. In view of the foregoing, need has existed for an improved hydraulic steering system that can provide a solution to the drawbacks revealed above.

SUMMARY OF THE INVENTION

Accordingly, it is an object of the invention to provide a failsafe hydraulic steering system for use in an industrial vehicle which can continue to produce the pressure fluid needed for the power steering operation, even when an engine or an engine-driven fluid pump should fail in the midst of movement of the industrial vehicle.

With this object in view, the present invention provides a failsafe hydraulic steering system for use in an industrial vehicle of the type having an engine, a fluid reservoir, a steering valve unit, an actuator control valve unit, a main fluid pump for pumping the fluid in the reservoir to feed pressure fluid to the steering valve unit and the actuator control valve unit and a priority valve for enabling the pressure fluid to be first supplied to the steering valve unit. Major feature of the steering system resides in the provision of an electric motor, power supply means selectively connected to the electric motor for supplying electric current to the electric motor, an auxiliary fluid pump rotatingly driven by the electric motor to produce emergency steering fluid to be fed to the steering valve unit and power supply control means for disconnecting the electric motor from the power supply means while the main pump produces the pressure fluid and for connecting the electric motor to the power supply means when no pressure fluid is discharged from the main pump.

BRIEF DESCRIPTION OF THE DRAWINGS

The above and other objects, features, advantages of the invention will become apparent from a review of the following detailed description of the preferred embodiment taken in conjunction with the accompanying drawings, in which.

DETAILED DESCRIPTION OF THE PREFERRED EMBODIMENT

Figure 1:
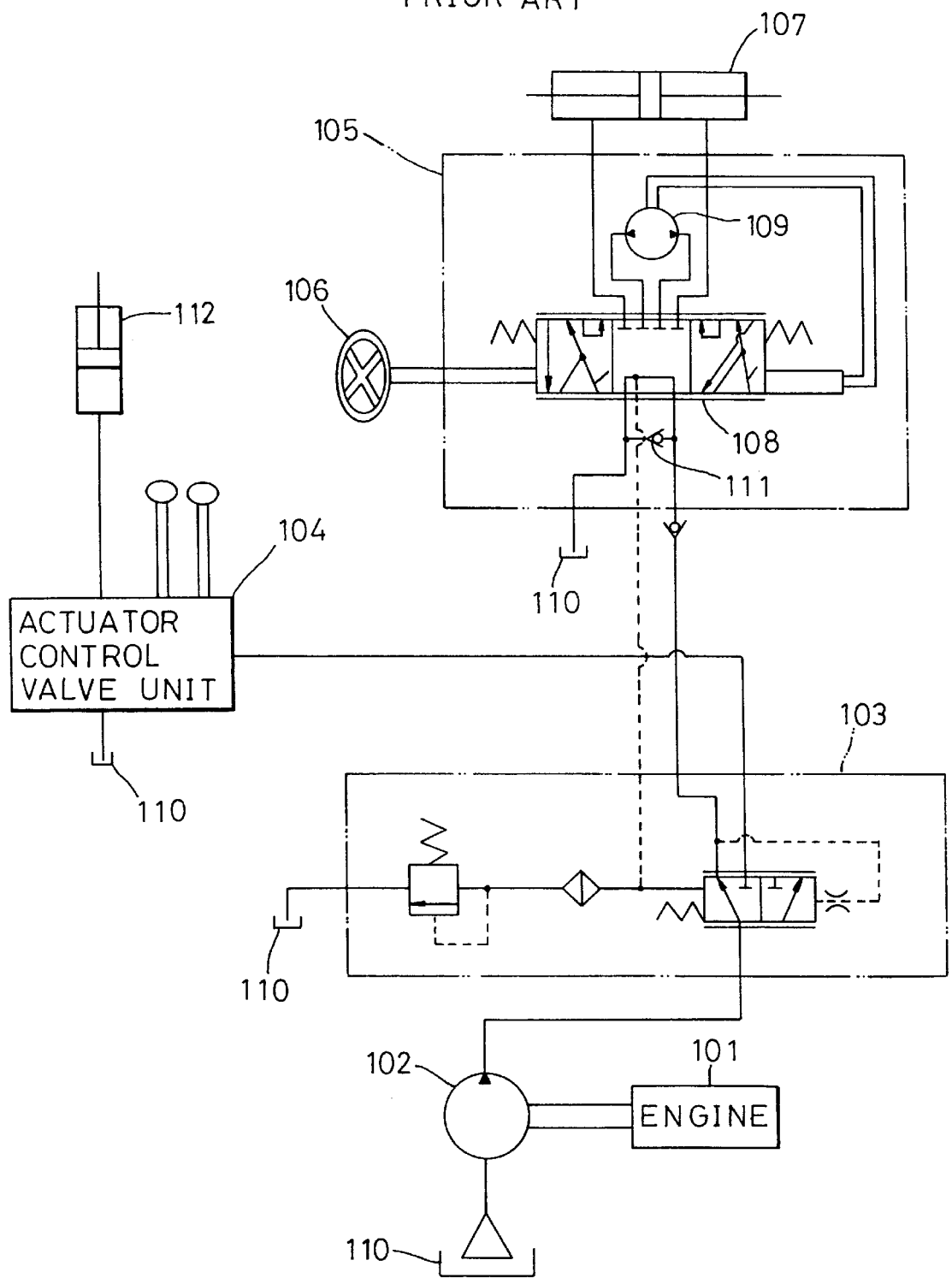
FIG. 1 is a fluid pressure circuit diagram showing a representative example of the prior art hydraulic steering systems.
Figure 2:
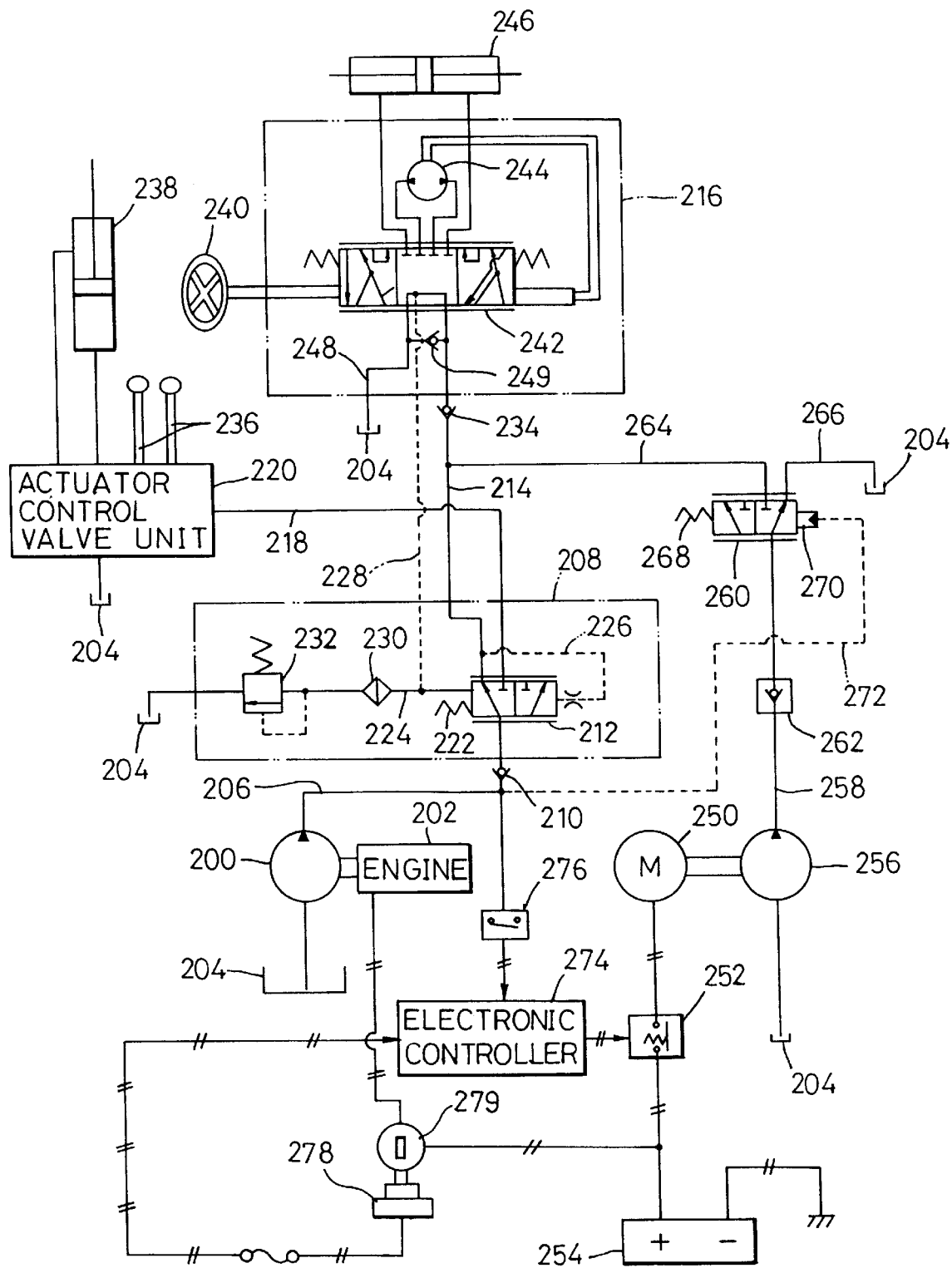
FIG. 2 is a fluid pressure circuit diagram illustrating a failsafe hydraulic steering system in accordance with the invention.

Referring now to FIG. 2, it can be seen that the failsafe hydraulic steering system of the invention includes a main fluid pump 200 which is rotatingly driven by an engine 202 to suck up the fluid contained in a reservoir 204 and then generate pressure fluid to be used in the steering system. The main fluid pump 200 is fluidly connected to a priority valve unit 208 via a main supply line 206, at the intermediate of which a check valve 210 is located so as to inhibit the pressure fluid from any backflow into the main fluid pump 200.

The priority valve unit 208 is provided with a priority valve 212 whose outlet side is fluidly associated with a steering valve unit 216 by way of a steering supply line 214 and with an actuator control valve unit 220 by way of an actuator supply line 218. The priority valve 212 may be shifted between a first operative position, namely, leftwardly moved position, wherein the main fluid pump 200 is allowed to communicate with the steering valve unit 216 and a second operative position, viz, rightwardly moved position, wherein the main fluid pump 200 is brought into communication with the actuator control valve unit 220.

A compression spring 222 is provided at one side of the priority valve 212 to normally urge the priority valve 212 toward the first operative position such that the pressure fluid can be first delivered to the steering valve unit 216 rather than the actuator control valve unit 220. At the same side of the priority valve 212 as the compression spring 222 lies, a control line 224 is in touch with the priority valve 212, while a pilot line 226 extending from the steering supply line 214 leads to the other side of the priority valve 212. As the fluid pressure in the pilot line 226 becomes greater than the biasing force of the spring 222 plus the fluid pressure in the control line 224, the priority valve 212 will move leftwards into the second operative position, allowing the pressure fluid in the main supply line 206 to go to the actuator control valve unit 220.

It should be noted that the control line 224 remains in communication with the steering valve unit 216 via a bypass line 228 on one hand and leads to the reservoir 204 by way of an oil filter 230 and a relief valve 232 on the other hand. A check valve 234 is provided on the steering supply line 224 to prohibit the pressure fluid in the steering valve unit 216 from any backflow into the priority valve 212. As known to the ordinary artisan in the art, the actuator control valve unit 220 lends itself either to feed the pressure fluid in the actuator supply line 218 to an actuator cylinder 238 or to permit the pressure fluid in the actuator cylinder 238 to be drained into the reservoir 204, depending on the pivoting direction and angle of a joystick or operating lever 236. The actuator cylinder 238 is operatively connected to a working implement, e.g., forks of the forklift truck, not shown in the drawings for simplicity.

The steering valve unit 216 includes a steering valve 242 whose position is controlled by a steering wheel 240 and a hydraulic motor 244 which remains mechanically connected to the steering wheel 240. The steering valve 242 may be shifted from a neutral position shown in FIG. 2 into a first or second operative position as the driver turns the steering wheel 240 in a desired direction. While in the neutral position, the steering valve 242 serves to prevent the pressure fluid in the steering supply 214 from passing therethrough and entering into a steering cylinder 246, thus maintaining the latter immovable. Upon the steering valve 242 being shifted to the first or second operative position, it allows the pressure fluid in the steering supply line 214 to be admitted into one of the fluid chambers of the steering cylinder 246, at which time the fluid in the other chamber of the steering cylinder 246 should be drained to the reservoir 204 via a steering drain line 248. The hydraulic motor 244 is adapted to feed a regulated amount of the pressure fluid to the steering cylinder 246 in proportion to the turning speed of the steering wheel 240. Positioned between the steering supply line 214 and the steering drain line 248 is a check valve 249 that permits the fluid in the steering drain line 248 to flow into the steering supply line 214 but inhibits any fluid flow in the reverse direction.

In accordance with the preferred embodiment of the invention, the hydraulic steering system further includes an electric motor 250 that may be selectively connected to a battery 254 by way of a relay switch 252 or other suitable relay means. Rotatingly connected to the electric motor 250 is an auxiliary pump 256 that, when operated, can produce emergency steering fluid under pressure. The auxiliary pump 256 leads to a directional control valve 260 via an auxiliary supply line 258 whereby the emergency steering fluid generated by the auxiliary pump 256 can be supplied to the directional control valve 260. It will be preferred that a check valve 262 is provided on the auxiliary supply line 258 to prevent any backflow of the fluid from the directional control valve 260 into the auxiliary pump 256.

The directional control valve 260 is connected at its outlet side both to the reservoir 204 via a first branch line 266 and to the steering supply line 214 via a second branch line 264. It will be appreciated that the directional control valve 260 is shiftable between a first operative position wherein the auxiliary pump 256 remains in communication with the reservoir 204 and a second operative position wherein the auxiliary pump 256 is allowed to communicate with the steering valve 242. A compression spring 268 is provided at one side of the directional control valve 260 to normally bias the latter toward the second operative position, whereas a pilot pressure chamber 270 is provided at the other side of the directional control valve 260 to apply pilot pressure to the latter. The pilot chamber 270 is in communication with the main supply line 206 via a pilot line 272. So long as the pressure fluid discharged from the main pump 200 is introduced into the pilot chamber 270, the directional control valve 260 will be kept in the first operative position against the biasing force of the compression spring 268. When no fluid pressure is developed in the pilot chamber 270, however, the directional control valve 260 would be automatically shifted to the second operative position under the biasing force of the compression spring 268.

As set forth earlier, the relay switch 252 is used to selectively connect and disconnect the electric motor 250 to and from the battery 254. The operation of the relay switch 252 may be controlled by an electronic controller 274 which maintains electrical connection with a pressure detector 276 and a engine ignition detector 278. The pressure detector 276 is attached to the main supply line 206 and continues to issue a pressure detection signal when it detects the fluid pressure developed in the main supply line 206. The engine ignition detector 278 is connected to an ignition switch 279 which lies between the engine 202 and the battery 278 so that it can generate an engine stop signal as soon as the ignition switch 279 is turned off. At the time one of the pressure detection signal and the engine stop signal is issued, the electronic controller 274 will permit the relay switch 252 to be kept open, thereby inhibiting activation of the electric motor 250. If the pressure detection signal and the engine stop signal are not issued, the electronic controller 274 will cause the relay switch 252 to become closed, assuring that the battery 254 should feed electric current to the electric motor 250.

Based on the description made hereinabove and referring to FIG. 2, operation of the failsafe hydraulic steering system will now be set forth in detail.

If the engine 202 begins to operate upon the ignition switch 279 being turned on, the main fluid pump 200 will be rotatingly driven to deliver pressure fluid to the priority valve 212 through the main supply line 206. Initially, since the priority valve 212 should be maintained in the first operative position under the biasing force of the compression spring 222, the pressure fluid will go to the steering valve 242 via the steering supply line 214.

Turning the steering wheel 240 in either direction at this moment will cause the steering valve 242 to move from the neutral position to the first or second operative position, whereby the pressure fluid in the steering supply line 214 is introduced into one of the fluid chambers of the steering cylinder 246 through the steering valve 242 and the hydraulic motor 244, thus rendering the power steering operation available. Increase in the turning speed of the steering wheel 240 results in faster rotation of the hydraulic motor 244, which in turn leads to corresponding increase of the flow rate of the pressure fluid fed to the steering cylinder 246. To the contrary, decrease in the turning speed of the steering wheel 240 will draw down the flow rate at which the pressure fluid is supplied to the steering cylinder 246. While the steering wheel 240 is not subjected to any rotation, the steering valve 242 will remain in the neutral position, in which case the pressure in the steering supply line 214 and hence in the pilot line 226 will be progressively increased to, at last, push the priority valve 212 against the biasing force of the compression spring 222 into the second operative position. This ensures that the pressure fluid in the main supply line 206 should be delivered to the actuator control valve unit 200 in its entirety.

In the meantime, during the time the main pump 200 continues to discharge the pressure fluid into the main supply line 206, the pressure of the fluid in the main supply line 206 is directly transmitted to the pilot chamber 270, whereby the directional control valve 260 is pushed against the biasing force of the compression spring 268 into the first operative position so that the auxiliary pump 256 may be connected to the reservoir 204. In case where the engine 202 and the main pump 200 are in their normal operative condition as discussed above, the pressure detector 276 will apply a pressure detection signal to the electronic controller 274, in response to which the electronic controller 274 acts to keep the relay switch 252 open, rendering the electric motor 250 disconnected from the battery 254. The result is that the auxiliary pump 256 does not produce any emergency steering fluid.

In the event that one of the engine 202 and the main pump 200 should fail for whatever reason, no pressure fluid will be discharged into the main supply line 206 and, therefore, the pressure detector 276 will no longer issue the pressure detection signal to the electronic controller 274. Moreover, since the ignition switch 279 remains turned on, no engine stop signal will be generated from the engine ignition detector 278. This will enable the electronic controller 274 to render the relay switch 252 closed such that the battery 254 may supply electric current to the electric motor 250. As the electric motor 250 is activated to rotatingly drive the auxiliary pump 256, the auxiliary pump 256 will discharge emergency steering fluid into the auxiliary supply line 258.

It is important to note that, when the main pump 200 does not produce any pressure fluid due to its failure or the failure of the engine 202, no fluid pressure will exert in the pilot chamber 270 of the directional control valve 260. As a result, the directional control valve 260 is shifted to the second operative position under the biasing force of the compression spring 268, bringing the auxiliary supply line 258 into fluid communication with the steering supply line 214. This makes it possible for the emergency steering fluid produced by the auxiliary pump 256 to be fed to the steering valve 242 via the directional control valve 260, whereby the power steering operation continues to be available despite the failure of the engine 202 or the main pump 200.

Once the vehicle incorporating the failsafe hydraulic steering system reaches a safety zone by relying upon the emergency steering function as described above, the driver will turn off the ignition switch 279, in response to which the engine ignition detector 278 will issue an engine stop signal to the electronic controller 274. Accordingly, the electronic controller 274 will cause the relay switch 252 to be open so that the electric motor 250 and the auxiliary pump 256 can cease to operate, thus terminating the emergency steering operation of the hydraulic steering system.

While the invention has been shown and described with reference to a preferred embodiment, it should be apparent to one of ordinary skill that many changes and modifications may be made without departing from the spirit and scope of the invention as defined in the claims.

What is claimed is:

1. A failsafe hydraulic steering system for use in an industrial vehicle having an engine, a fluid reservoir, a steering valve unit, an actuator control valve unit, a main fluid pump driven by the engine for pumping a fluid in the reservoir to feed pressure fluid to the steering valve unit and the actuator control valve unit and a priority valve for enabling the pressure fluid to be first supplied to the steering valve unit, wherein the improvement comprises:

an electric motor;

a power supply selectively connected to the electric motor for supplying electric current to the electric motor;

an auxiliary fluid pump driven by the electric motor to produce emergency steering fluid to be fed to the steering valve unit;

a power supply control for disconnecting the electric motor from the power supply while the main pump produces the pressure fluid and for connecting the electric motor to the power supply when no pressure fluid is discharged from the main pump; and a directional control valve shiftable between a first operative position wherein the auxiliary pump is in communication with the reservoir and a second operative position wherein the auxiliary pump comes into communication with the steering valve unit to direct the emergency steering fluid to the steering valve unit.

2. The failsafe hydraulic steering system as recited in claim 1, wherein the power supply control comprises a relay switch provided between the electric motor and the power supply, a pressure detector installed at the outlet side of the main pump for issuing a pressure detection signal while the main pump produces the pressure fluid, an engine ignition detector for generating an engine stop signal when the engine is disconnected from the power supply and an electronic controller in association with the pressure detector and the engine ignition detector for keeping the relay switch open in response to the pressure detection signal or the engine stop signal and for causing the relay switch to be closed when both the pressure detection signal and the engine stop signal are not generated.

3. The failsafe hydraulic steering system as recited in claim 2, wherein the main pump is connected to the priority valve via a main supply line, and the pressure detector is installed on the main supply line for detection of the fluid pressure in the main supply line.

4. The failsafe hydraulic steering system as recited in claim 1, wherein the main pump is connected to the priority valve via a main supply line, and further comprising a check valve located on the main supply line to inhibit the emergency steering fluid from backflow into the main pump.

5. The failsafe hydraulic steering system as recited in claim 1, wherein a compression spring is provided at one side of the directional control valve to bias the directional control valve toward the second operative position and wherein a pilot chamber is provided at the other side of the directional control valve, the pilot chamber remaining in communication with the main pump so that the pressure fluid discharged from the main pump can enter the pilot chamber to shift the directional control valve into the first operative position against the biasing force of the compression spring.

6. A failsafe hydraulic steering system for use in an industrial vehicle having an engine, a fluid reservoir, a steering valve unit, an actuator control valve unit, a main fluid pump driven by the engine for pumping a fluid in the reservoir to feed pressure fluid to the steering valve unit and the actuator control valve unit and a priority valve for enabling the pressure fluid to be first supplied to the steering valve unit, wherein the improvement comprises:

an electric motor;

a power supply selectively connected to the electric motor for supplying electric current to the electric motor;

an auxiliary fluid pump driven by the electric motor to produce emergency steering fluid to be fed to the steering valve unit;

a power supply control for disconnecting the electric motor from a power supply while the main pump produces the pressure fluid and for connecting the electric motor to the power supply when no pressure fluid is discharged from the main pump;

wherein the main pump is connected to the priority valve via a main supply line, and further comprising a check valve located on the main supply line to inhibit the emergency steering fluid from backflow into the main pump;

further comprising a directional control valve and a compression spring provided at one side of a directional control valve to bias the directional control valve toward a second operative position and wherein a pilot chamber is provided at the other side of the directional control valve, the pilot chamber remaining in communication with the main pump so that the pressure fluid discharged from the main pump can enter the pilot chamber to shift the directional control valve into a first operative position against the biasing force of the compression spring.

* * * * *